Oct. 24, 1961  K. R. HESSE  3,005,708
METHOD OF MAKING A SCREEN MEMBER
Filed May 29, 1957

United States Patent Office 3,005,708
Patented Oct. 24, 1961

3,005,708
METHOD OF MAKING A SCREEN MEMBER
Kenneth R. Hesse, Elmira, N.Y., assignor to Westinghouse Electric Corporation, East Pittsburgh, Pa., a corporation of Pennsylvania
Filed May 29, 1957, Ser. No. 662,466
4 Claims. (Cl. 96—35)

This invention relates to screens, and more particularly to a method of making luminescent screens suitable for use in cathode ray tubes.

In the formation of luminescent screens for use in cathode ray tubes, a method known as a photoresist method is frequently used. In this method, a luminescent material, such as copper-activated zinc sulphide phosphor, is deposited upon a support member, which, for example, may be the face plate of a cathode ray tube. A photosensitive binder material, such as potassium dichromate-sensitized polyvinyl alcohol, is also deposited. This photosensitive binder material is soluble in certain solvents, such as water. The photosensitive binder material may be mixed with the phosphor material and deposited with the phosphor, or it may be deposited after the phosphor. Then the photosensitive material is exposed to a suitable pattern of radiant energy of a given wavelength for a suitable length of time. The radiant energy causes a reaction in the photosensitized material which has the effect of making it insoluble in certain solvents, in this case water. The unexposed, soluble photosensitized binder material may then be removed by washing, or other methods, which also removes the phosphor material in the unexposed areas of the screen. The remaining phosphor material impregnated with the insolubilized binder forms the luminescent screen having the desired pattern.

The length of time of exposure and the intensity of the radiant energy are factors in determining to what depth the photosensitive material is affected. The length of exposure time is determined by the intensity of the radiation and the size of the image desired. If we consider the case of a sharply defined vertical beam of radiation entering a horizontal phosphor layer, it is found that some of the energy is transmitted through this layer of crystals and emerges on the other side. Another portion is reflected and scattered from the randomly oriented crystal faces in all directions. The portion reflected at right angles to the beam, travels horizontally through the phosphor layer until it becomes completely absorbed in the crystal-binder matrix or lost by further scattering. Likewise, a portion of the beam traveling directly through the phosphor layer is also absorbed by the crystal-binder matrix. It is this absorbed energy that produces the insolubilization of the photosensitized binder. The above-mentioned lateral scattering causes the image to be larger in dimensions then the light beam. Increasing the exposure time or the intensity of the radiant energy therefore, has the effect of exposing the image to unusable proportions.

There is, consequently, a maximum thickness of photosensitized phosphor material that can be used whereby the length of exposure is balanced between the size of image and the insolubilization of the binder material down to the surface of the substrate to prevent washoff of the image during development. A shorter exposure does not insolubilize the binder down to the glass interface because of absorption of radiant energy of the needed frequency by the top layers of phosphor and photosensitized binder. Therefore, upon development of the latent image, there is no adhesion of the base of the image to the glass and the image washes away. A longer exposure, on the other hand, because of the lateral scattering, produces a larger image than required. For example, dots in a tricolor aperture mask cathode ray tube become too large in diameter. Therefore, when screens thicker than this maximum are used, luminescent screens must be made in two cycles by depositing, exposing and removing undesirable portions and then depositing, exposing and removing again. This two-cycle process is time consuming and expensive.

Thick luminescent screens are particularly desirable in certain radar applications, in order to enhance the efficiency of the persistence of the phosphor. The thickness of these screens is generally expressed as a weight per unit area, e.g. milligrams per square centimeter ($mg./cm.^2$). Generally speaking the screens suitable for radar purposes have a density of 8–15 $mg./cm.^2$ depending upon the particular phosphor material being used.

It was found that when this thickness of typical radar phosphor is used for photographic application, the resulting structure, e.g.—dots, washed off during development because of insufficient insolubilization of the polyvinyl alcohol at the glass phosphor interface. The thickest layer that could be used in this respect was 5 $mg./cm.^2$. Screens of this light weight do not have the light output or phosphorescent efficiency of the thicker layers. Electrons are wasted by impingement on the glass substrate which is visible to the beam when this light screen weight is used. In most sulphide phosphors having comparatively long persistence characteristics, there will be a number of comparatively large (a diameter of 40 microns or more) phosphor particles. Even in comparatively thin luminescent screens, these large phosphor particles tend to block the impinging radiant energy during the exposure step, thus preventing portions of the photosensitive binder material from being properly exposed. The subsequent washing step, therefore, dissolves the improperly exposed photosensitive binder material, which has the effect of leaving holes in the luminescent screen. This is particularly true when the improperly exposed material is close to the support member.

While is is possible to remove these large particles from the phosphor material by screening or grinding, this involves additional processing and expense, and may have an undesirable effect on the characteristics of the phosphor. However, even if the phosphor particles are made small enough, the overall thickness and the length of time necessary for processing and exposure remain as problems.

Therefore, it is an object of this invention to provide an improved method of making a screen.

It is another object to provide an improved method of making a luminescent screen.

It is a further object to provide an improved method of making a luminescent screen by a photoresist process.

It is still another object to provide an improved method of making a luminescent screen by a photoresist process in which a photosensitive phosphor layer is exposed to radiant energy from each side.

These and other objects of my invention will be apparent from the following description taken in accordance with the accompanying drawing, throughout which like reference characters indicate like parts, which drawing forms a part of this application and in which.

These drawings are highly idealized. It should be remembered that the layers shown consist of crystalline material. Thin layers for typical screen are from 2–10 crystals thick.

Figure 1:
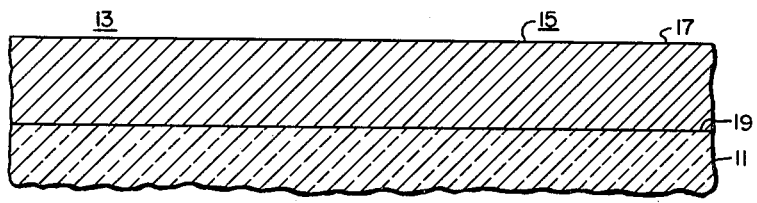
FIGURE 1 is a semi-schematic sectional view of a portion of a luminescent screen after the first step in the manufacture of the screen in accordance with one embodiment of my invention.

In FIG. 1, there is shown a sectional view of a luminescent screen in the early part of its manufacture including a transparent support member 11 upon which an unexposed photosensitive phosphor layer 15 has been deposited. The transparent support member 11 may be made of a material such as glass and should be transparent to the impinging radiation used in exposing the photosenstive material as discussed below and to the radiation generated by the luminescent material during operation of the screen. The photosensitive phosphor layer 15 has an outer surface 19 located adjacent to the transparent support member 11 and an inner surface 17 on the opposite side of the photosensitive phosphor 15. The phosphor layer 15 may be applied to the glass surface by any of a number of means. A suitable method would be settling the phosphor material from a suspension in a liquid medium. For example, the following technique would be used in applying a radar phospohr, designated P 14/2, consisting of copper-activated zinc cadmium sulfide, onto the face of a 15" panel. A cushion layer consisting of 4500 ml. of deionized water containing 2.13 g. of dissolved strontium nitrate is poured into a face panel clamped into a settling table. The phosphor 8.0 grams, equivalent to 8 mg./cm.$^2$, is suspended in 170 ml. of 14% potassium silicate (Sylvania PS–5 grade) and 50 ml. of deionized water. This suspension is sprayed into the cushion so that a uniform screen is obtained. After settling for 45 minutes the supernatant liquid is decanted and the resultant phosphor layer is dried. A photosensitive binder material, such as potassium dichromate sensitized polyvinyl alcohol, is then flowed over the deposited phosphor material, seeps through the phosphor material and is dried. The sensitized polyvinyl alcohol solution may be prepared by dissolving 25 grams of polyvinyl alcohol (Du Pont grade 52–22), in 600 ml. of deionized water. Add 5.5 grams of reagent grade ammonium dichromate dissolved in 25 ml. of deionized water. Mix well and add 200 ml. of denatured alcohol (Solox). Continue agitation for five minutes.

Of course, other methods of applying the phosphor layer 15 to the transparent support member 11 may be used, such as spraying the phosphor material upon the transparent support which has been previously coated with a suitable photosensitive material. Also, if the phosphor material is sprayed upon the transparent support member 11, it may be desirable to mix the photosensitive binder material with the phosphor material as an integral part of the spray mixture. If the phosphor material is applied by flowing, the photosensitive binder material may be mixed with the phosphor and become an integral part of the slurry used in the flow coating. If the phosphor material has been settled upon the transparent support member 11 from a liquid suspension, the photosensitive binder material may be sprayed upon the surface of the phosphor material after it has been settled. In the case where the phosphor material is air-settled or dusted, the photosensitive binder material may be applied to the transparent support member 11 by flowing or spraying before the phosphor material is applied. In general the photosensitive binder material should not be harmful to the screen materials used, should change solubility characteristics radically upon exposure to radiant energy of a given wavelength, and must form a strong bond between the glass and the luminescent material.

After the photosensitive phosphor portion 15 has been deposited upon the transparent support member 11, as shown in FIG. 1, it is exposed to a source of radiant energy of a desired pattern for a suitable length of time. When the photosensitive binder material is exposed to radiant energy of a suitable wave length, it becomes insoluble in certain solvents and causes a good bond to be formed between the phosphor particles. For example, when potassium dichromate sensitized polyvinyl alcohol is used, ultraviolet light consisting principally of the 2537 A. and 3650 A. lines of the mercury spectrum may be used as the radiant energy. The ultraviolet light may be projected through a suitable mask or similar structure to form the desired pattern of strips, dots, etc. In the particular embodiment shown in FIG. 2 the inner surface 17 of the unexposed photosensitive phosphor 15 has been exposed to the radiant energy in such a way as to form an exposed inner portion 21 in a desirable pattern. The remaining unexposed photosensitive phosphor portion 20 is also shown. In this particular embodiment the phosphor material has been exposed to a 1000 watt mercury arc lamp at a distance of about 16 inches for a period of approximately 12 minutes using a quartz concentrator having an effective area of 0.120 sq. in. This has effect of exposing the phosphor to a point source of light. An aperture mask may be used which has a suitable dot pattern.

Figure 2:
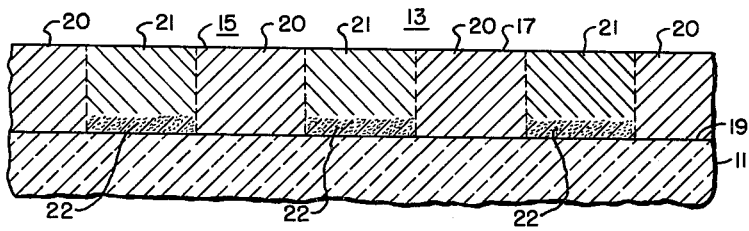
FIG. 2 is a semi-schematic sectional view of a portion of a luminescent screen after a second step in the manufacture of said screen according to one embodiment of my invention.

Actually the boundary, particularly the bottom boundary, between the exposed inner portion 21 and the unexposed photosensitive portion 20 is not quite as sharp and distinct as shown in FIG. 2. The lower portion 22 of the exposed inner portion 21 may extend down to the support member 11, but the exposure and therefore the insolubilization of these lower portions is incomplete. This incomplete insolubilization results in an inadequate bond to the support member 11 and in inadequate bonding between the phosphor particles themselves.

Figure 3:
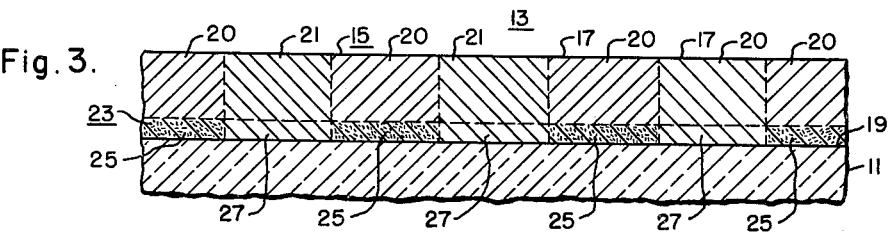
FIG. 3 is a semi-schematic sectional view of a portion of a luminescent screen after a third step in the manufacture of said screen according to one embodiment of my invention.

This incomplete insolubilization may be completed as shown in FIG. 3. The luminescent screen member 13 shown in FIG. 3 which has been applied upon the transparent support member 11 includes the photosensitive phosphor layer 15 having an outer surface 19 and an inner surface 17. The phosphor layer 15 includes an unexposed portion 20 and an exposed inner portion 21. The photosensitive phosphor material has been exposed to ultraviolet light through the transparent support member 11, so that the entire outer surface 19 has been exposed to the ultraviolet light, thereby forming an exposed outer portion 23 comprised of a completely insolubilized portion 27 and a partially insolubilized portion 25. The exposed outer portion 23 must not be exposed to the radiant energy for too long a time or the desired portions of it will not be easily removable as discussed below. I have found that an exposure of approximately 30 seconds to a 1000 watt mercury arc lamp as mentioned above at a distance of about 16 inches will give an exposed outer portion of suitable thickness and insolubility. This exposure through the support member has the effect of completing the insolubilization of the partially insolubilized lower portion 22 forming the completely insolubilized portion 27. However, the remainder of the exposed outer portion 23 is made up of partially insolubilized portions 25.

It has sometimes been found to be desirable to use a larger diameter source of light in the exposure through the support member 11 rather than a point source of light as is normally used. A fluorescent lamp emitting desirable wavelengths has been found to be suitable. A large diameter source allows better control over the exposure since the radiant energy will be weaker and a longer exposure may be used. Also the distribution of radiant energy over the total area will also be more uniform which is desirable in order to gain more control over the process.

In the next step, the unexposed photosensitive phosphor portion 20 of FIG. 3 may be removed by a washing technique, and in the particular case in which potassium dichromate sensitized polyvinyl alcohol is used, demineralized water is a suitable solvent. The actual removal process may be by flowing the solvent over the luminescent screen member 13, or by brushing lightly after the screen has been dried after being washed with the solvent. Also, in some embodiments, the luminescent screen member may be washed in a tray as in normal photographic developing processes.

Figure 4:
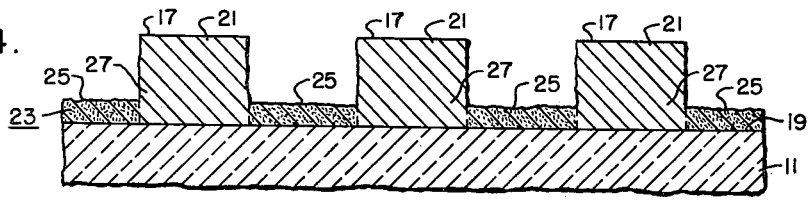
FIG. 4 is a semi-schematic sectional view of a portion of a luminescent screen after a fourth step in the manufacture of said screen according to one embodiment of my invention.
Figure 5:
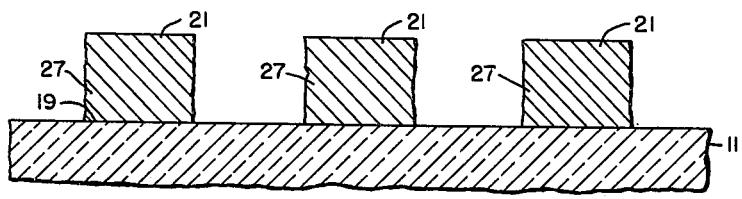
FIG. 5 is a semi-schematic sectional view of a portion of a complete luminescent screen according to one embodiment of my invention.

After the unexposed photosensitive phosphor portion 20 has been removed, the luminescent screen member 13 has the appearance similar to that shown in FIG. 4 in which the outer surface 19 and the inner surface 17 of the luminescent screen member 13 are shown, including the exposed inner surface 21 and the exposed outer surface 23. Also shown are the uncovered partially insolubilized outer portions 25 and the covered completely insolubilized outer portions 27 of the luminescent screen member 13. As shown in FIG. 4, the uncovered partially insolubilized outer surface 23 is adjacent the areas from which the unexposed photosensitive phosphor portion 20 had been removed. At this stage of the manufacture, the luminescent screen, when viewed through the transparent support member 11, appears to have the desirable pattern, such as dots or stripes, seen vaguely through a general fog. After drying, the luminescent screen member 13 may be brushed using a regular camel's hair paint brush and the uncovered partially insolubilized outer portions 25 may be removed leaving the completed luminescent screen member as shown in FIG. 5. If the exposure through the support member 11 has been of sufficient intensity and duration part of the uncovered outer portion 25 may have been completely insolubilized. However, if this completely insolubilized part is thin enough, it may also be removed as described above.

Of course, in this method, either monochromatic luminescent screen members may be formed or color screen members, such as tricolor luminescent screens, for use in color television. Also, many other phosphor materials, such silver-activated zinc sulphide, copper-activated zinc sulphide, manganese-activated zinc orthosilicate, etc., may be used. When multicolor luminescent screens are desired, the various phosphors which emit the desired colors upon excitation may be applied successively to the support member utilizing the methods disclosed above. As can readily be seen, this method may also be used in decreasing the overall deposition time of thinner luminescent screens such as are used in regular color television cathode ray tubes. In general, the method of my invention may be used in connection with a photoresist process for making any kind of screen member. Therefore, materials other than those sensitive to cathode luminescence may be used, such as electroluminescent, photoluminescent, ferroelectric, etc. materials.

While the present invention has been shown in one form only, it will be obvious to those skilled in the art that it is not so limited but is susceptible of various changes and modifications without departing from the spirit and scope thereof.

I claim as my invention:

1. A method of making a screen member, said method including the steps of applying a photosensitive layer upon a support member, said support member being transmissive to radiant energy of a given wavelength, said layer having a first surface adjacent said support member and a second surface on the opposite side of said layer from said first surface, directing radiations onto said second surface to expose portions of said photosensitive layer to a radiant energy pattern so that a boundary is formed within said photosensitive layer and within said exposed portions, said photosensitive layer being substantially completely insolubilized between said boundary and said second surface and incompletely insolubilized between said boundary and said support member, uniformly exposing said first surface to radiant energy of said given wavelength through said support member thereby substantially completely insolubilizing the previously incompletely insolubilized portion of said photosensitive layer below said boundary adjacent said support member and incompletely insolubilizing the remainder of said photosensitive layer adjacent said support member, removing the unexposed portions of said photosensitive layer, and removing said incompletely insolubilized remainder of said photosensitive layer between said support member and said boundary.

2. A method of making a luminescent screen member, said method including the steps of applying a luminescent material and a photosensitive binder material upon a support member to form a photosensitive luminescent layer upon said support member, said support member being transmissive to radiant energy of a given wavelength, said layer having a first surface adjacent said support member and a second surface on the opposite side of said layer from said first surface, directing radiations onto said second surface to expose portions of said photosensitive layer to a radiant energy pattern so that a boundary is formed within said photosensitive layer and within said exposed portions, said photosensitive layer being substantially completely insolubilized between said boundary and said second surface and incompletely insolubilized between said boundary and said support member, uniformly exposing said first surface to radiant energy of said given wavelength through said support member thereby substantially completely insolubilizing the previously incompletely insolubilized portion of said photosensitive layer below said boundary adjacent said support member and incompletely insolubilizing the remainder of said photosensitive layer adjacent said support member, removing the unexposed portions of said photosensitive layer, and removing said incompletely insolubilized remainder of said photosensitive layer between said support member and said boundary.

3. A method of making a luminescent screen member, said method including the steps of applying a luminescent material and a photosensitive binder material upon a support member to form a photosensitive luminescent layer upon said support member, said support member being transparent to radiant energy of a given wavelength, said photosensitive binder material being soluble in a given solvent, said layer having a first surface adjacent said support member and a second surface on the opposite side of said layer from said first surface, directing a radiation pattern onto said second surface to expose portions of said layer to said pattern of radiant energy so that said portions become insoluble with respect to said given solvent, directing uniform radiation onto said first surface to expose said layer to radiant energy of said given wavelength through said support member so that substantially all of said photosensitive binder material adjacent said support member becomes at least partially insoluble with respect to said given solvent, removing any unexposed portions of said photosensitive layer with the aid of said solvent, and removing portions of said photosensitive layer adjacent said support member, which portions are adjacent the areas from which said unexposed portions of said photosensitive layer were dissolved.

4. A method of making a screen member, said method including the steps of applying a screen material and a photosensitive binder material upon a support member to form a photosensitive layer upon said support member, said support member being transparent to radiant energy of a given wavelength, said photosensitive binder material being soluble in a given solvent, said layer having a first surface adjacent said support member and a second surface on the opposite side of said layer from said first surface, directing a desired pattern of radiant energy onto said second surface to expose portions of said screen to a first given thickness so that said portions become insoluble with respect to said given solvent, directing a uniform radiation onto said first surface to expose said screen to a second given thickness so that the exposed photosensitive binding material adjacent said support member becomes at least partially insoluble with respect to said given solvent, removing any unexposed portions of said photosensitive layer with the aid of said solvent and removing portions of said photosensitive layer between the areas from which said unexposed portions of said photosensitive layer were dissolved and said support member.

References Cited in the file of this patent

UNITED STATES PATENTS

| 1,464,140 | Sauer | Aug. 7, 1923 |
| 1,957,433 | Bassist | May 8, 1934 |
| 2,607,684 | Nowak et al. | Aug. 19, 1952 |
| 2,747,997 | Smith | May 29, 1956 |

OTHER REFERENCES

Levey et al.: "Sylvania Technologist," vol. 6, No. 3, July, 1953, pp. 62–63.

Tory: "Photolithography" Graphic Arts Monthly, Chicago, Ill. 1953, p. 77.

Friedman: Mistory of Color Photography, The American Photographer Publishing Co. Boston, 1944, p. 432.